(12) United States Patent
Kirk et al.

(10) Patent No.: US 9,229,101 B2
(45) Date of Patent: Jan. 5, 2016

(54) SYSTEMS AND METHODS FOR PERFORMING WINGTIP PROTECTION

(71) Applicant: Honeywell International Inc., Morristown, NJ (US)

(72) Inventors: James C Kirk, Clarksville, MD (US); Long Bui, Palos Verdes Estates, CA (US); David C Vacanti, Renton, WA (US); Catherine L Freeman, Peachtree Corners, FL (US)

(73) Assignee: Honeywell International Inc., Morris Plains, NJ (US)

( * ) Notice: Subject to any disclaimer, the term of this patent is extended or adjusted under 35 U.S.C. 154(b) by 284 days.

(21) Appl. No.: 13/899,298

(22) Filed: May 21, 2013

(65) Prior Publication Data

US 2013/0321194 A1    Dec. 5, 2013

Related U.S. Application Data

(60) Provisional application No. 61/706,632, filed on Sep. 27, 2012.

(51) Int. Cl.
*G01S 13/93* (2006.01)
*G01S 13/66* (2006.01)
(Continued)

(52) U.S. Cl.
CPC .............. *G01S 13/66* (2013.01); *B60Q 9/008* (2013.01); *B64C 25/42* (2013.01); *B64D 43/00* (2013.01);
(Continued)

(58) Field of Classification Search
CPC ........ B60Q 9/008; B64C 25/32; B64C 25/42; B64D 43/00; B64D 45/00; G08G 5/04; G08G 5/045; G08G 5/06; G08G 5/065; G01S 13/66; G01S 13/74; G01S 13/76; G01S 13/765; G01S 13/88; G01S 13/93; G01S 13/931; G01S 2013/9335; G01S 2013/9339; G01C 23/00

USPC .............. 342/27–51, 61, 70–72, 73–81, 342/147–158, 175, 195, 13, 350, 385, 386, 342/407, 410, 411; 343/700 R, 705–708, 343/711–717; 701/300, 301
See application file for complete search history.

(56) References Cited

U.S. PATENT DOCUMENTS 3,212,089 A * 10/1965 Longacre et al. ............. 342/149
3,349,394 A * 10/1967 Carver .......................... 342/156
(Continued)

FOREIGN PATENT DOCUMENTS

| EP | 0526424 A2 | 7/1992 |
| EP | 1923717 A1 | 5/2008 |
| EP | 1787142 B1 | 11/2008 |

OTHER PUBLICATIONS

Jones, "Keeping Cars from Crashing," IEEE Spectrum, Sep. 3, 2001, 6 pp.
(Continued)

*Primary Examiner* — Bernarr Gregory
(74) *Attorney, Agent, or Firm* — Shumaker & Sieffert, P.A.

(57) ABSTRACT

Systems and methods for creating a narrow vertical pathway of detection that permits the enforcement of a fixed "exclusion zone" that is narrow and does not widen with range. An advantage to this approach is that the zone or corridor does not widen with range, permitting a fixed exclusion zone that will ignore items that will pass above or below the wing. An exemplary system located on a vehicle includes at least two vertically separated antennas that receive radar reflection signals, a processor, and an output device. The processor receives the radar reflection signals received by the antennas, determines vertical position of any obstacles identified in the radar reflection signals and determines if the obstacles are within a predefined alert zone. The output device outputs an alert if any obstacle is within the alert zone. The predefined alert zone is related to a protruding portion of the vehicle.

15 Claims, 9 Drawing Sheets

(51) Int. Cl.
- *B60Q 9/00* (2006.01)
- *G08G 5/04* (2006.01)
- *G01S 13/76* (2006.01)
- *G08G 5/06* (2006.01)
- *B64C 25/42* (2006.01)
- *B64D 43/00* (2006.01)
- *B64D 45/00* (2006.01)
- *G01C 23/00* (2006.01)
- *G01S 13/00* (2006.01)

(52) U.S. Cl.
CPC ............... *B64D 45/00* (2013.01); *G01C 23/00* (2013.01); *G01S 13/765* (2013.01); *G01S 13/93* (2013.01); *G01S 13/931* (2013.01); *G08G 5/04* (2013.01); *G08G 5/045* (2013.01); *G08G 5/065* (2013.01); *G01S 2013/9335* (2013.01); *G01S 2013/9339* (2013.01)

(56) References Cited

U.S. PATENT DOCUMENTS

| | | | |
|---|---|---|---|
| 3,761,927 A * | 9/1973 | Amoroso, Jr. | 342/156 |
| 3,766,556 A * | 10/1973 | Amoroso, Jr. | 342/156 |
| 4,101,893 A * | 7/1978 | Lewis | 342/411 |
| 4,160,974 A * | 7/1979 | Stavis | 342/154 |
| 4,170,774 A * | 10/1979 | Schaefer | 342/156 |
| 4,334,224 A * | 6/1982 | Gordon | 342/149 |
| 4,918,442 A * | 4/1990 | Bogart, Jr. | 342/29 |
| 6,087,995 A * | 7/2000 | Grace et al. | 343/713 |
| 6,118,401 A | 9/2000 | Tognazzini | |
| 6,297,762 B1 * | 10/2001 | Labitt | 342/13 |
| 6,486,798 B2 | 11/2002 | Rast | |
| 6,963,293 B1 | 11/2005 | Rast | |
| 7,055,994 B2 | 6/2006 | Martin | |
| 7,188,983 B2 | 3/2007 | Dunn | |
| 7,379,165 B2 | 5/2008 | Anderson et al. | |
| 7,579,980 B2 | 8/2009 | Anderson et al. | |
| 7,783,427 B1 | 8/2010 | Woodell et al. | |
| 7,869,305 B2 | 1/2011 | Anderson et al. | |
| 7,903,023 B2 | 3/2011 | Cornic et al. | |
| 8,121,786 B2 | 2/2012 | Morbey et al. | |
| 8,264,377 B2 | 9/2012 | Griffith | |
| 8,988,277 B2 * | 3/2015 | Leise et al. | 342/80 |
| 2006/0022866 A1 | 2/2006 | Walton et al. | |
| 2006/0044177 A1 | 3/2006 | Wittenberg et al. | |
| 2009/0174591 A1 | 7/2009 | Cornic et al. | |
| 2010/0204867 A1 | 8/2010 | Longstaff | |
| 2011/0087417 A1 | 4/2011 | Anderson et al. | |
| 2011/0279304 A1 | 11/2011 | Yonemoto et al. | |
| 2013/0321169 A1 | 12/2013 | Bateman et al. | |
| 2013/0321176 A1 | 12/2013 | Vasek et al. | |
| 2013/0321177 A1 | 12/2013 | Kirk | |
| 2013/0321192 A1 | 12/2013 | Starr et al. | |
| 2013/0321193 A1 | 12/2013 | Vasek et al. | |
| 2013/0325245 A1 | 12/2013 | Kolcarek et al. | |
| 2013/0325312 A1 | 12/2013 | Khatwa et al. | |

OTHER PUBLICATIONS

Langer et al. "Fusing Radar and Vision for Detecting, Classifying and Avoiding Roadway Obstacles," Intelligent Vehicles, Tokyo, Japan, Sep. 18-20, 1996, 6 pp.

Shirakawa et al. "3D-Scan Millimeter-Wave Radar for Automotive Application," Fujitsu Ten Technical Journal No. 28, Feb. 2013, 5 pp.

Search Report from counterpart European application No. 13184623.0, dated Jan. 22, 2014, 3 pp.

U.S. Appl. No. 13/706,858, by Tomas Kabrt et al., filed Dec. 6, 2012.

U.S. Appl. No. 13/742,688 by James C. Kirk et al., filed Jan. 16, 2013.

U.S. Appl. No. 13/835,122 by Andrew F. Lamkin et al., filed Mar. 15, 2013.

U.S. Appl. No. 13/889,537 by Matej Dusik et al., filed May 8, 2013.

Examination Report from counterpart European Patent Application No. 13184623.0, dated Jan. 31, 2014, 5 pp.

Response to Examination Report dated Jan. 31, 2014, from counterpart European Patent Application No. 13184623.0, dated Dec. 18, 2014, 11 pp.

* cited by examiner

FIG.1 *(Prior Art)*

SYSTEMS AND METHODS FOR PERFORMING WINGTIP PROTECTION

PRIORITY CLAIM

This application claims the benefit of U.S. Provisional Application Ser. No. 61/706,632, filed Sep. 27, 2012, the content of which is hereby incorporated by reference in its entirety. The entire content of U.S. Provisional Application Ser. No. 61/653,297, filed May 30, 2012, is also incorporated by reference herein.

BACKGROUND OF THE INVENTION

The use of radar to detect threats to the wingtips of aircraft faces the problem that, for large aircraft with wide wingspans, many features commonly found around airports, such as ground vehicles and personnel, lane markers, and runway drains, may all serve to trigger false threats when the wing, and the sensor, approach or pass over them. Anticollision systems must have very low false-alarm rates to be useful to the operators. The use of very narrow beam patterns to distinguish threats fails due to the general ratio of wing height versus range, which can be as much as 100:1, see FIG. 1. So the ability to actually determine the height of the object, or in the case of hangar opening proscenia (the upper clearance) becomes very important.

SUMMARY OF THE INVENTION

The present invention provides systems and methods for creating a narrow vertical pathway of detection that permits the enforcement of a fixed "exclusion zone" that is narrow and does not widen with range. An advantage to this approach is that the zone or corridor does not widen with range, permitting a fixed exclusion zone that will ignore items that will pass above or below the wing.

An exemplary system located on a vehicle includes at least two vertically separated antennas that receive radar reflection signals, a processor, and an output device. The processor receives the radar reflection signals received by the antennas, determines vertical position of any obstacles identified by the radar reflection signals, and determines if the obstacles are within a predefined alert zone. The output device outputs an alert if any obstacle is within the alert zone. The predefined alert zone is related to a protruding portion of the vehicle.

In one aspect of the invention, the processor further determines the vertical position by taking a phase differential of corresponding radar reflection signals and determining vertical position based on the phase differential.

In another aspect of the invention, the protruding portion of the vehicle includes at least one of a portion of a wing or a portion of a nacelle attached to the wing.

In yet another aspect of the invention, the system includes a memory device that stores obstacle information, based on associated determined vertical position information, in a three-dimensional buffer.

In still another aspect of the invention, the predefined alert zone includes a volume of space along at least one of a projection forward of a vehicle structure or a current path of the vehicle structure.

In a further aspect of the invention, the predefined alert zone has a constant upper limit, a constant lower limit, a first distance limit, and a second distance limit, wherein the shape of the predefined alert zone is based on the vehicle structure that the predefined alert zone relates to.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
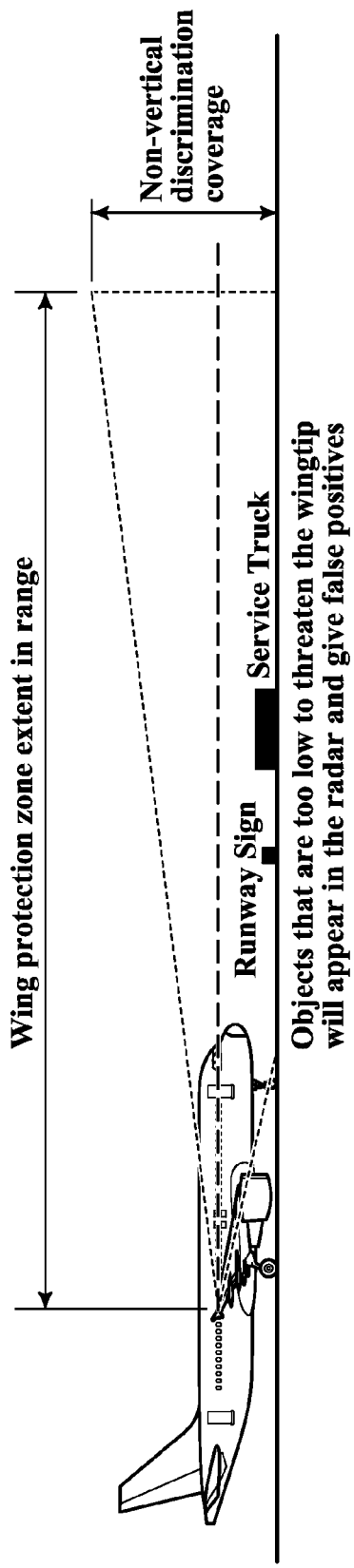
FIG. 1 is a side view of an aircraft that is implementing a wingtip collision-avoidance system according to an embodiment of the present invention.
Figure 2:
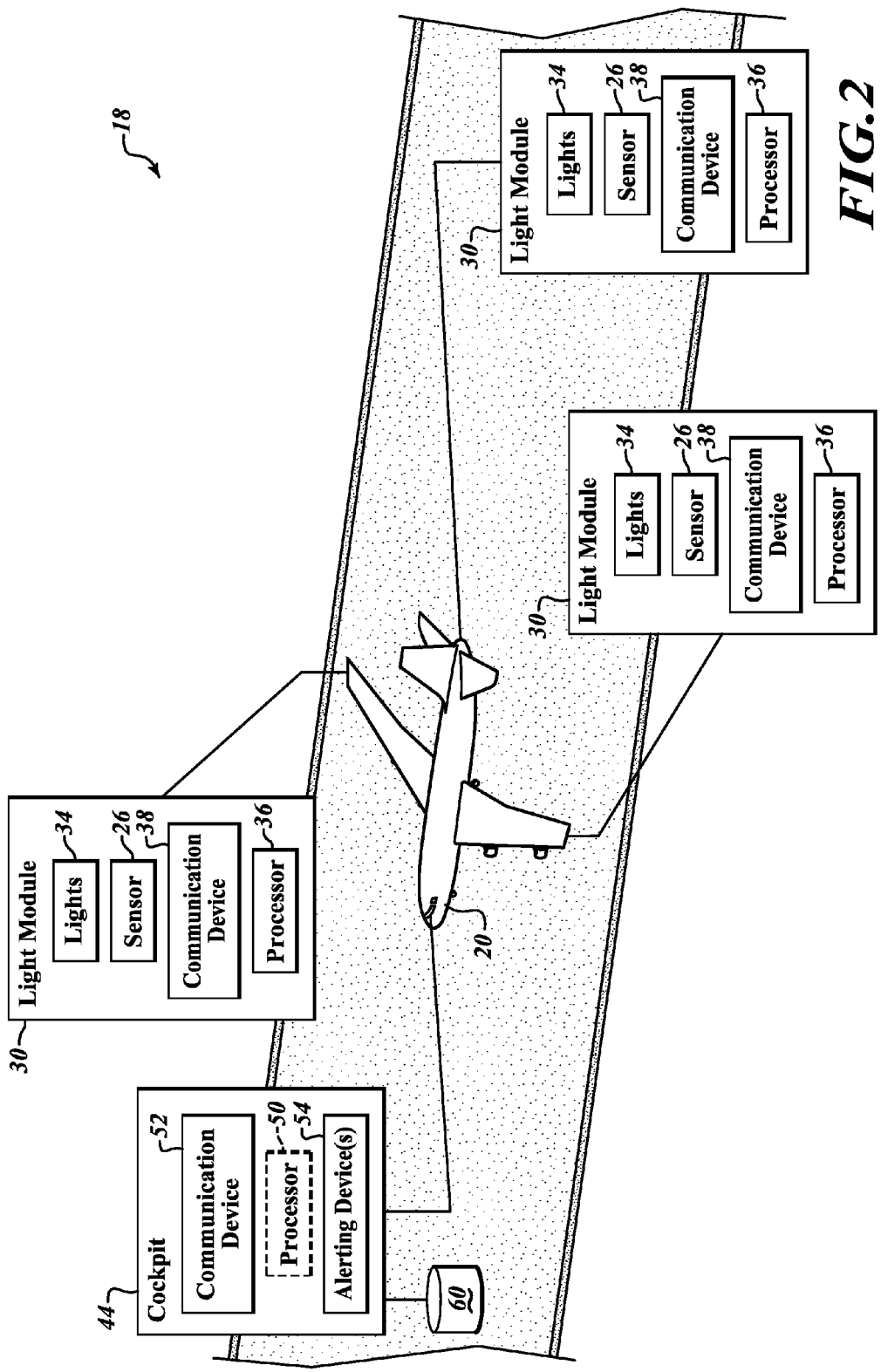
FIG. 2 is a schematic image of a vehicle formed in accordance with an embodiment of the present invention.

In one embodiment, as shown in FIG. 2, an aircraft 20 includes an exemplary airport surface collision-avoidance system (ASCAS) 18. The ASCAS 18 includes horizontally and vertically discriminating radar sensors 26 included within aircraft light modules 30 or located at the other positions (e.g., vertical tail) about the aircraft 20. The light modules 30 also include navigation/position lights 34, a processor 36, and a communication device 38. The sensors 26 are in communication via the communication device 38 (wired or wirelessly) to a user interface (UI) device 44.

In one embodiment, the UI device 44 includes a processor 50 (optional), a communication device (wired or wireless) 52, and alerting device(s) 54. The UI device 44 provides audio and/or visual cues (e.g., via headphones, tablet PC, etc.) based on sensor-derived and processed information.

Based on information from the radar sensors 26, the UI device 44 provides some or all of the following functions: detect and track intruder obstacles, evaluate and prioritize threats, radar control, and declare and determine actions. Once an alert associated with a detection has been produced, then execution of a collision-avoidance action (e.g., stop the aircraft, maneuver around obstacle, etc.) is manually performed by the operator or automatically by an automated system (e.g., autobrakes).

In one embodiment, processing of the radar information is done by the processor 36 and/or the processor 50 at the UI device 44.

In one embodiment, the antennas are installed at other fuselage areas, such as above each engine or at the nose of the aircraft, etc. Even though the antennas are not at the wingtip, the reflection data (radar return data) is buffered (stored), thus allowing the image 120 to be displayed.

The information from multiple radar systems may be used to attain full coverage relative to the aircraft 20, the wingtips, nacelles, and/or other aircraft structures. In one embodiment, all radar reflection data is stored in a three-dimensional buffer referenced to the vehicle (e.g., aircraft).

The pilot is alerted aurally, visually, and/or tactilely. For example, a visual alert presented on an electronic flight bag (EFB) display shows aircraft wingtips outlined or a highlight of any obstructions. Aural alerting is through existing installed equipment, such as the interphone or other warning electronics or possibly the enhanced ground proximity warning system (EGPWS) platform.

In one embodiment, two antennas (or two antenna arrays) arranged vertically and spaced at a precise interval (e.g., λ/2 (half wavelength)). A single radar pulse is emitted from the two antennas or a third antenna. Any radar pulse returns (reflections) are received by the vertically separated antennas. The return signals are sent to the processor (36, 50) that determines vertical position of an obstacle (i.e., performs vertical discrimination) based on a determined phase differential between two corresponding received return signals.

Figure 3:
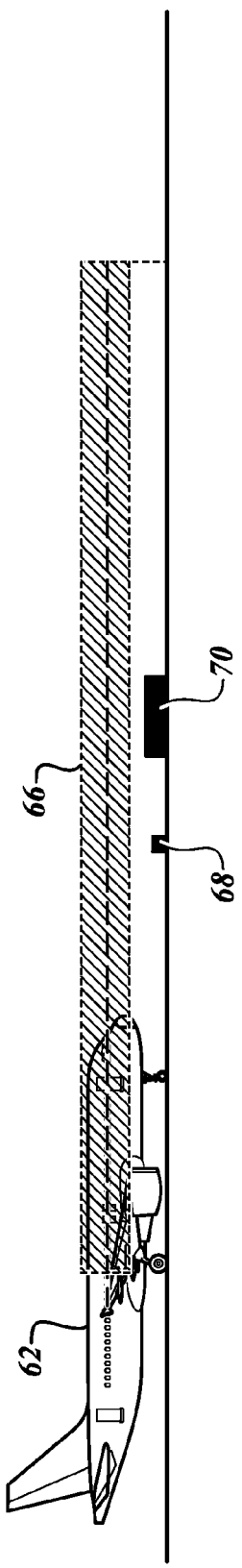
FIG. 3 is a side view of an aircraft with a determined exclusion zone.
Figure 4:
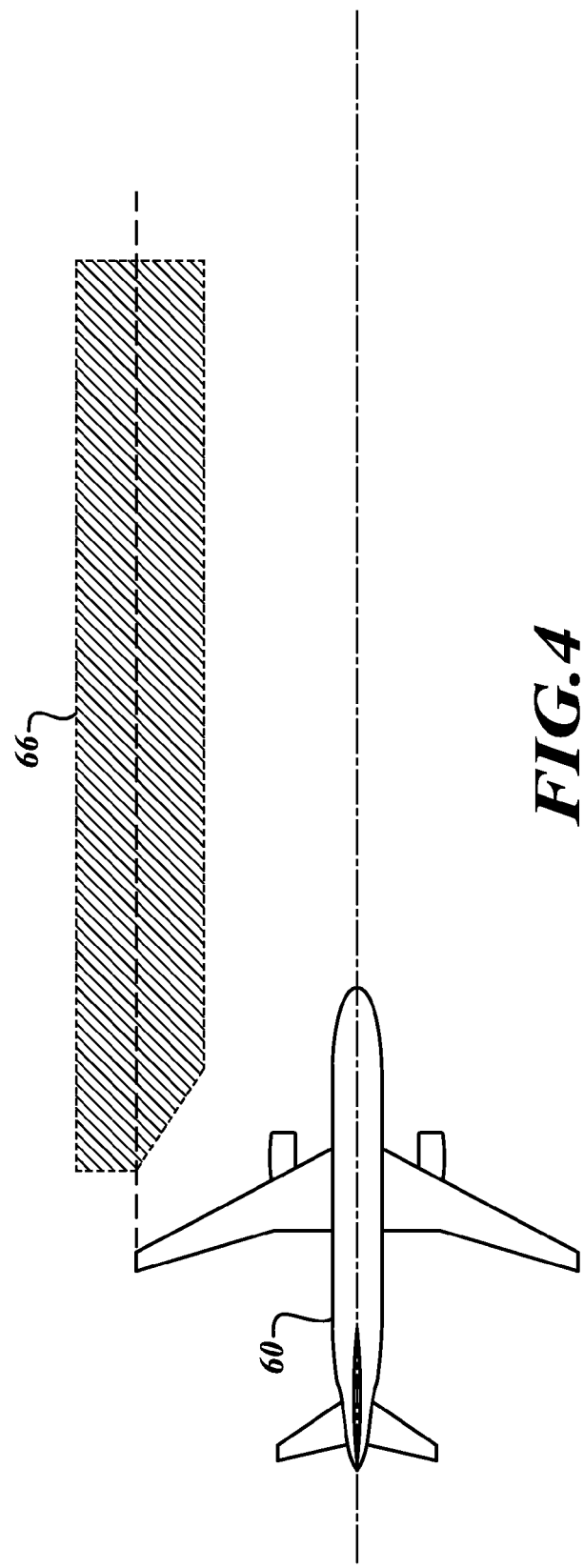
FIG. 4 is a top view of the aircraft with the exclusion zone.

The processor (36, 50) determines horizontal and vertical information for obstacles based on the horizontal and vertical discriminations performed on the raw radar return signals. If any identified obstacles are located both horizontally and vertically within a previously defined wingtip protection zone 66 that extends forward vertically and laterally from a wingtip of an aircraft 62—see FIGS. 3 and 4, the identified obstacle is treated as a possible threat. An alert for all threats is outputted to the operator of the aircraft 62.

The antennas can be implemented in many ways. In one embodiment, a 4×2 array of antenna elements allows for a four input digital beam forming algorithm to discriminate targets in the horizontal direction and a two input monopulse discrimination of targets in the vertical direction. There are many different schemes for implementing the digital beam forming and monopulse. Monopulse discrimination is implemented as a phase comparison via a simple equation:

$$\Delta z = R \frac{\Delta \phi}{2\pi} \frac{\lambda}{d}$$

where
λ is the wavelength of the radar frequency,
d is the distance between the antenna elements,
Δφ is the phase difference of the received signals of the two elements, in radians,
R is the range to the target determined by the radar, and
Δz is the vertical offset of the target from the antenna boresight.

The sign of the offset indicates whether the target is above or below the boresight.

In one embodiment, the processor (36, 50) stores obstacle information in a three-dimensional buffer, where the wingtip protection zone 66 includes a subset of information (i.e., cells, voxels) from the three-dimensional buffer. The phase differential is used to determine if any of the detected obstacles are in the "exclusion zone" through which the wing will travel. Objects above or below this exclusion zone may be ignored. In this example, a runway sign 68 and service truck 70 are shown in front of the aircraft 62. The runway sign 68 and service truck 70 are not considered a threat to the wing/wingtip of the aircraft 62 because the are below the wingtip protection zone 66.

Figure 5:
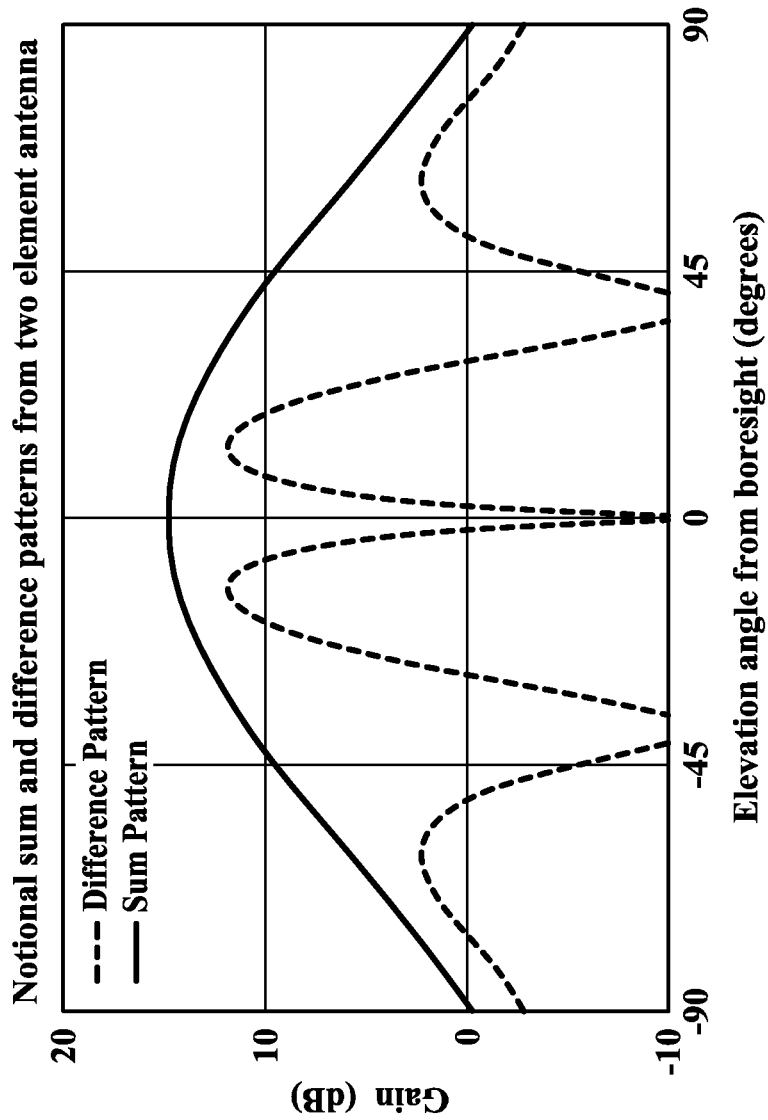
FIG. 5 is graph showing representative beam patterns of a notional sensor having a two channel input used for incoming signal phase detection.

FIG. 5 shows representative beam patterns of a notional sensor having a two channel input used for incoming signal phase detection. The use of a wide field of view sensor having the given wide pattern characteristics alone provides range capability only to a given target. The use of the dual channels, and through the use of phase comparison as described above, permits the simple sensor to perform angular location on the target and permits the determination of height, or in the case of proscenium signs or thresholds, the projection downward, and extent of the target.

Figure 6:
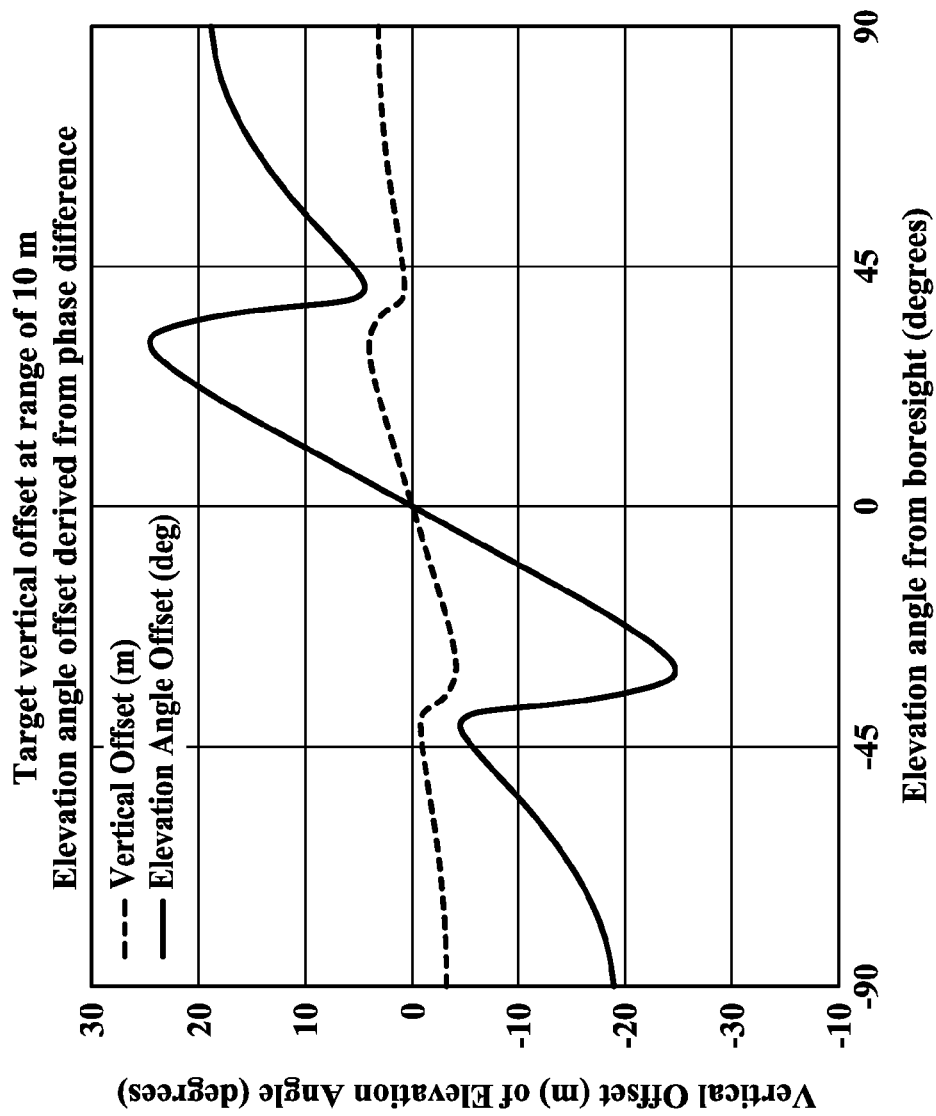
FIG. 6 is graph showing the relative phase offset from a given target height.

FIG. 6 shows how the dual channel (in each plane, but the elevation is shown here) receiver can determine the vertical placement of the target via phase comparison, and that the resulting phase differentials are easily measured to provide a height to accuracies that permit the establishment of the required "safe zone" for passage of the wing and/or the nacelles.

Figure 7:
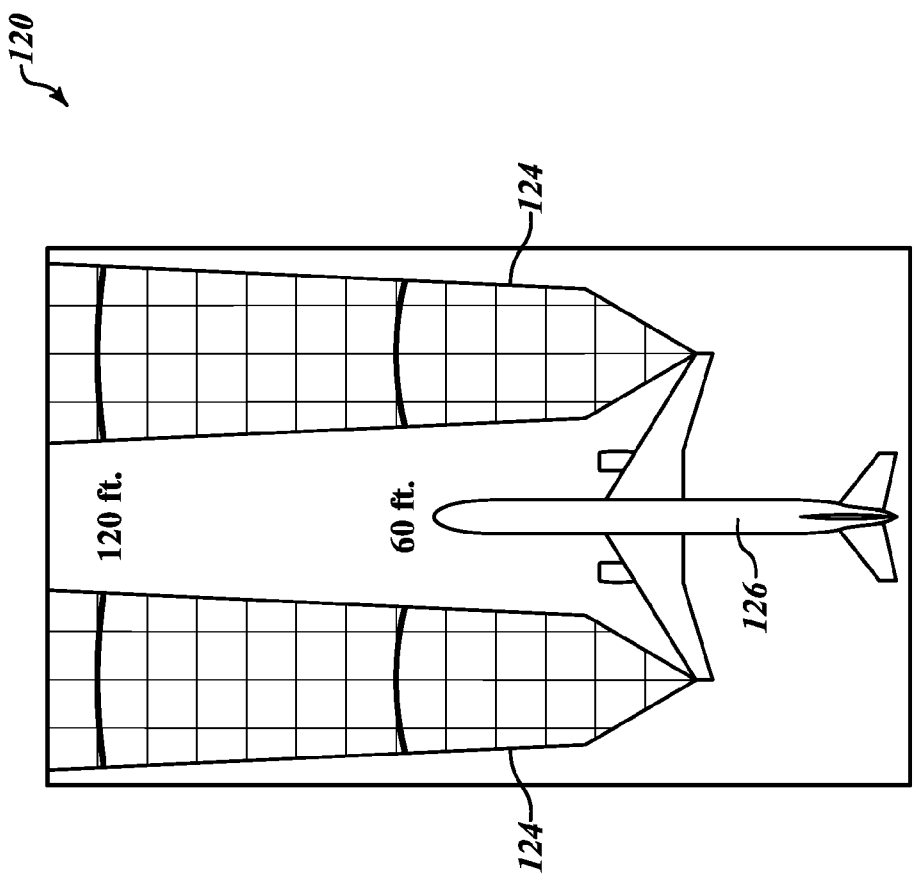
FIG. 7 is a user interface image generated by the system shown in FIG. 2.

FIG. 7 shows a top-down image 120 presented on a display that is part of the alerting device 54. The image 120 includes an ownship aircraft icon 126 with two radar beam coverage areas 124 that project forward from wingtips of the icon 126. The coverage areas 124 show only what is identified as being within the zone 66. Two range rings 132, 134 arbitrarily placed at maximum and half range are shown on the image 120 at fixed distances in front of the wing and can be scaled using either an interface on the EFB or IPAD, a tablet computer commercially available from Apple Inc. of Cupertino, Calif., or the cursor control device (CCD) in the aircraft, when shown on a navigation display.

Figure 8:
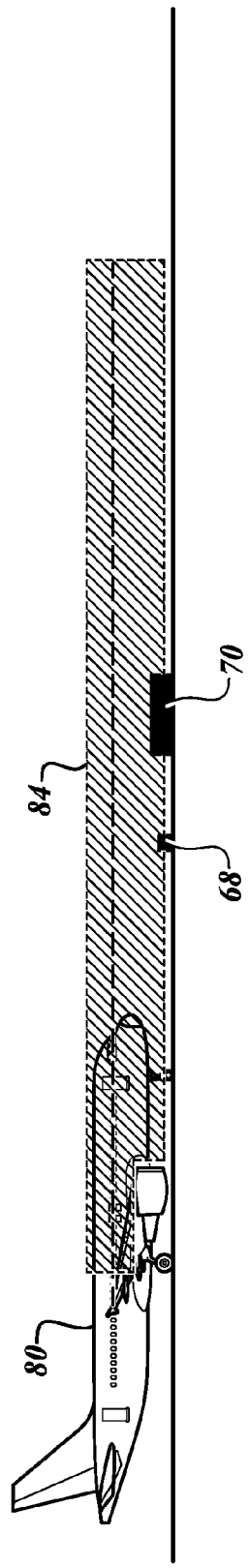
FIGS. 8 and 9 are side and top views of an aircraft with a determined wing and nacelle exclusion zone.
Figure 9:
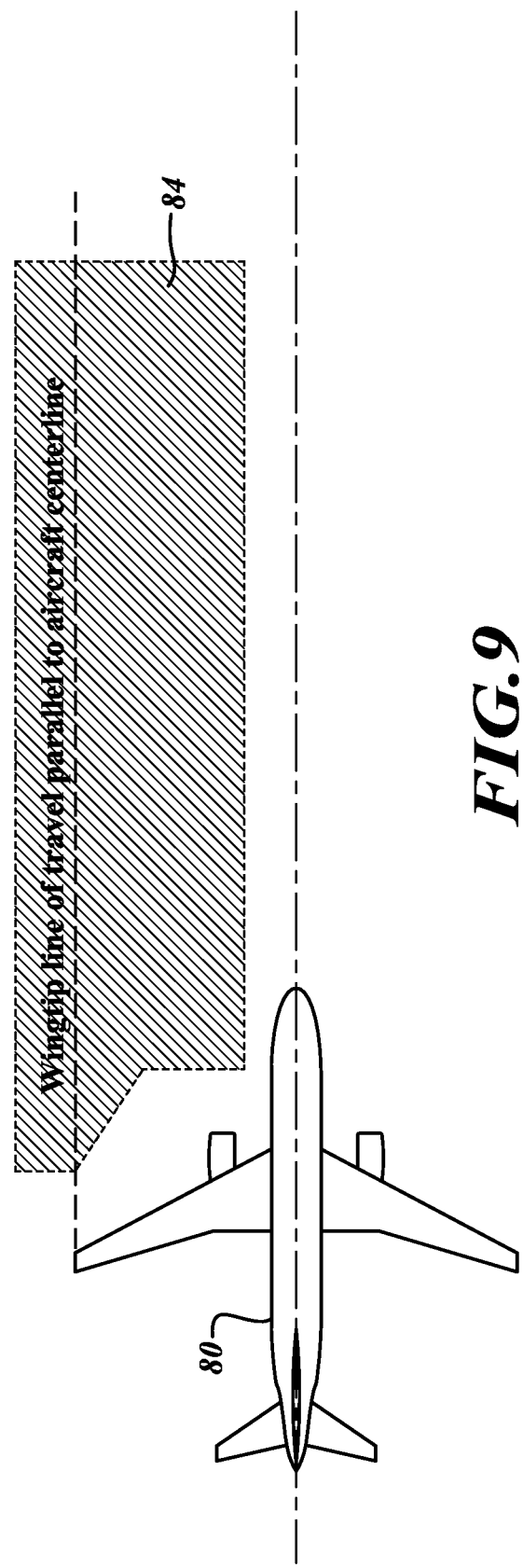

As shown in FIGS. 8 and 9, another aircraft 80 has expanded protection zones 84. The expanded protection zone 84 includes a protection volume ahead of part of the aircraft's wings and engine nacelles. The zone 84 is thicker vertically along the projected path of the below wing engine nacelles. The zone 84 may be modified to provide a protection zone around any structure that extends above or below the wing. In this example, the runway sign 68 and the service truck 70 are considered a threat to the wing/wingtip of the aircraft 62 because their corresponding radar reflection signals appear within the expanded protection zone 84.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A system located on a vehicle, the system comprising:
   at least two vertically separated antennas configured to receive radar reflection signals, wherein the antennas are spaced at a half wavelength interval from each other;
   a processor configured to:
   receive the radar reflection signals received by the antennas,
   determine a vertical position of any obstacles identified in the radar reflection signals based on monopulse discrimination by at least determining a phase differential of corresponding radar reflection signals and determining the vertical position based on the phase differential, and
   determine if the obstacles are within a predefined alert zone; and
   an output device configured to output an alert if any obstacle is within the alert zone,
   wherein the predefined alert zone is related to a protruding portion of the vehicle and defined by whether the motion of the vehicle will result in collision with an object located therein.

2. The system of claim 1, wherein the protruding portion of the vehicle comprises at least one of a portion of a wing or a portion of a nacelle attached to the wing.

3. The system of claim 1, further comprising:
   a memory device configured to store obstacle information in a three-dimensional buffer based on associated determined vertical position information.

4. The system of claim 1, wherein the predefined alert zone comprises a volume of space along at least one of a projection forward of a vehicle structure or a current path of the vehicle structure.

5. The system of claim 1, wherein the predefined alert zone has a constant upper limit, a constant lower limit, a first distance limit and a second distance limit, wherein the shape of the predefined alert zone is based on the vehicle structure that the predefined alert zone relates to.

6. A method comprising:
    at at least two vertically separated antennas spaced at a half wavelength ($\lambda/2$) interval from each other, receiving radar reflection signals;
    at a processor:
        receiving the radar reflection signals received by the antennas;
        determining a vertical position of any obstacles identified in the radar reflection signals based on monopulse discrimination, wherein determining the vertical position comprises:
            determining a phase differential of corresponding radar reflection signals; and
            determining the vertical position based on the phase differential; and
        determining if the obstacles are within a predefined alert zone; and
    at an output device, outputting an alert if any obstacle is within the alert zone,
    wherein the predefined alert zone is related to a protruding portion of the vehicle and defined by whether the motion of the vehicle will result in collision with an object located therein.

7. The method of claim 6, wherein the vehicle is an aircraft and the protruding portion of the aircraft comprises at least one of a portion of a wing or a portion of a nacelle attached to the wing.

8. The method of claim 6, further comprising:
    storing obstacle information in a three-dimensional buffer based on associated determined vertical position information.

9. The method of claim 6, wherein the predefined alert zone comprises a volume of space along at least one of a projection forward of a vehicle structure or a predefined path of the vehicle structure.

10. The method of claim 6, wherein the predefined alert zone has a constant upper limit, a constant lower limit, a first distance limit, and a second distance limit, wherein the shape of the predefined alert zone is based on the vehicle structure that the predefined alert zone relates to.

11. A system comprising:
    first and second means for receiving radar reflection signals, the first and second means for receiving radar reflection signals being spaced at a half wavelength ($\lambda/2$) interval from each other;
    means for receiving the radar reflection signals received from the first and second means for receiving radar reflection signals;
    means for determining a vertical position of any obstacles identified in the radar reflection signals based on monopulse discrimination, wherein the means for determining the vertical position comprises:
        means for determining a phase differential of corresponding radar reflection signals; and
        means for determining the vertical position based on the phase differential;
    means for determining if the obstacles are within a predefined alert zone; and
    means for outputting an alert if any obstacle is within the alert zone,
    wherein the predefined alert zone is related to a protruding portion of the vehicle and defined by whether the motion of the vehicle will result in collision with an object located therein.

12. The system of claim 11, wherein the vehicle is an aircraft and the protruding portion of the aircraft comprises at least one of a portion of a wing or a portion of a nacelle attached to the wing.

13. The system of claim 11, further comprising:
    a means for storing obstacle information in a three-dimensional buffer based on associated determined vertical position information.

14. The system of claim 11, wherein the predefined alert zone comprises a volume of space along at least one of a projection forward of a vehicle structure or a predefined path of the vehicle structure.

15. The system of claim 11, wherein the predefined alert zone has a constant upper limit, a constant lower limit, a first distance limit, and a second distance limit, wherein the shape of the predefined alert zone is based on the vehicle structure that the predefined alert zone relates to and whether the motion of the vehicle will result in collision with an object located therein.

* * * * *